United States Patent [19]

Suzuki

[11] Patent Number: 4,888,456

[45] Date of Patent: Dec. 19, 1989

[54] VEHICLE TURN SIGNAL CANCELLING DEVICE

[75] Inventor: Masaru Suzuki, Aichi, Japan

[73] Assignee: Kabushiki Kaisha Tokai-Rika-Denki-Seisakusho, Aichi, Japan

[21] Appl. No.: 281,515

[22] Filed: Dec. 8, 1988

[30] Foreign Application Priority Data

Dec. 14, 1987 [JP] Japan ................................. 62-315780

[51] Int. Cl.$^4$ ......................... H01H 3/16; B60K 20/06
[52] U.S. Cl. ................................. 200/61.27; 200/61.3;
200/61.31; 200/61.34; 200/61.35; 200/61.54
[58] Field of Search ................. 200/61.27, 61.3, 61.31,
200/61.34, 61.35, 61.54

[56] References Cited

U.S. PATENT DOCUMENTS

| | | | |
|---|---|---|---|
| 3,609,264 | 9/1971 | Suzuki et al. | 200/61.34 |
| 3,829,638 | 8/1974 | Suzuki | 200/61.27 |
| 4,323,877 | 4/1982 | Morita et al. | 200/61.3 |
| 4,365,121 | 12/1982 | Morita et al. | 200/61.27 |
| 4,368,393 | 1/1983 | Izawa et al. | 200/61.27 X |
| 4,571,469 | 2/1986 | Hanaki | 200/61.31 X |

Primary Examiner—J. R. Scott

Attorney, Agent, or Firm—Sixbey, Friedman, Leedom & Ferguson

[57] ABSTRACT

A cancelling device for a turn signal includes a cam guide member rotated by a steering wheel, a cylindrical cam body fitted on the outer periphery of the cam guide member in such a manner as to be pivotal, and a driving mechanism for bringing the cam guide member into engagement with the cylindrical cam body after eliminating a predetermined amount of play when the steering wheel is turned so as to allow the cylindrical cam body to be turned. The cylindrical cam body has first and second cam portions formed thereon. The cam guide member has a first slip portion for allowing the first cam portion to be elastically deformed inwardly when the cylindrical cam body is turned to the right and the first cam portion thereby makes contact with a ratchet portion of a mechanism portion located at a cancelling position. The cam guide member also has a second slip portion for allowing the second cam portion to be elastically deformed inward when the cylindrical cam body is turned to the left and the second cam portion thereby makes contact with the ratchet portion located at the cancelling position. In consequence, a reverse cancelling angle can be set at a value larger than that of a cancel preparation angle.

17 Claims, 7 Drawing Sheets

VEHICLE TURN SIGNAL CANCELLING DEVICE

BACKGROUND OF THE INVENTION

1. Field of the Invention:

The present invention relates to a cancelling device for a turn signal which automatically returns to a neutral position and an operation lever which has been operated to indicate the turning direction of a vehicle when the steering shaft of the vehicle is turned in the direction opposite to that in which the operation lever has been turned.

2. Description of the Related Art:

A conventional cancelling device for a turn signal includes a cam cylindrical body which has two cam portions and which is provided coaxially with respect to the steering shaft, and a turn signal switching mechanism portion operated by means of an operation lever. A ratchet is moved to a cancelling position by the pivoting of the operation lever from a neutral position to a right or left turn position. When the operation lever is pivoted to the right or left turn position and the steering shaft is then turned through a predetermined angle in the same direction as that in which the operation lever is operated, the turning of the steering wheel in the opposite direction causes the cam portions of the cylindrical body pivoted by the steering wheel to abut against the ratchet located at the cancelling position, thereby returning the operation lever to the neutral position. The turn signal switching mechanism portion employed in the above-described cancelling device falls into two types: one type includes a bifurcated bracket with two ratchets respectively used for right and left turns provided at the two end portions thereof, the bracket being provided in such a manner as to surround the cam cylindrical portion and the bracket being pivoted by the operation lever; and the other type includes one ratchet which is provided on the same side of the mechanism portion as that on which the operation lever is provided.

The turn signal switching mechanism portion of the first type has an advantage in that a cancel preparation set separately by changing the limit positions of the two ratchets. The cancel preparation angle is the rotational angle through which the cam position travels as it is moved to a position just past the ratchet which is located at the canceling positioning, when the steering wheel is turned to the right (or to the left) where the operation lever of the turn signal switching mechanism portion has been pivoted from the neutral position to the right (or respectively to the left) turn position and the ratchet has been thereby moved to the canceling position. Subsequent turning of the steering wheel from this position to the left (or respectively to the right) immediately causes the cam portion to abut against the ratchet, thereby causing the operation lever to return to its neutral position. The reverse canceling angle is the rotational angle through which the cam portion travels when it is brought into abutment with the ratchet located at the canceling position to return the operation lever to its neutral position when the steering wheel is turned to the left (or to the right) where the operation lever of the turn signal switching mechanism portion has been pivoted from the neutral position to the right (or respectively to the left) turn position and the ratchet has been thereby moved to the canceling position. The cancel preparation angle in the switching mechanism of the first type is generally set at about 80 degrees and the reverse canceling angle is generally set at 120 degrees or above. However, since the bracket and the ratchets are provided in such a manner that they enclose the cam cylindrical portion, i.e., the steering shaft, the steering wheel must be removed to remove the turn signal switching mechanism portion when the turn signal switching mechanism portion is repaired, making any such repair job a troublesome task.

On the other hand, the turn signal switching mechanism of the second type is advantageous in terms of facilitating the repair thereof, because there is no need for removal of the steering wheel. However, since it has only one ratchet, this precludes the possibility of setting the cancel preparation angle and the reverse cancelling angle at different angles. Thus, if the cancel preparation angle is set at about 80 degrees, the reverse cancelling angle must also be set at approximately 80 degrees. In consequence, when for example the steering wheel is turned to the left in order to pull the vehicle to the left side of a road after the operation lever has been brought to the right turn position, the operation lever returns to its neutral position if the steering wheel is turned through a small angle, which may be about 80 degrees, so the operation lever then has to be brought to the right turn position again.

SUMMARY OF THE INVENTION

Accordingly, an object of the present invention is to provide a cancelling device for a turn signal of a vehicle which enables a reverse cancelling angle to be set to a value which is larger than that of a cancel preparation angle and which facilitates overhaul of the mechanism portion when the reverse cancelling angle is set to a value larger than that of the cancel preparation angle.

To this end, the present invention provides a cancelling device for a turn signal of a vehicle which comprises: a mechanism portion having one ratchet portion which is moved to a cancelling portion in accordance with the operation of an operation lever which is operated from a neutral position to right and left turn positions; a first cylindrical body which is turned by a steering wheel; a second cylindrical body provided on the outer periphery of the first cylindrical body in such a manner as to be pivotal relative to the first cylindrical body; a driving mechanism for bringing the first cylindrical body into engagement with the second cylindrical body after eliminating a predetermined amount of play so as to turn the second cylindrical body is the same direction as that in which the first cylindrical body is turned when the first cylindrical body is turned to the left or to the right by turning the steering wheel to the left or to the right; elastically deformable first and second cam portions formed on the second cylindrical body at positions that are symmetrical in the circumferential direction of the second cylindrical body with respect to the driving mechanism; and first and second slip portions formed in the first cylindrical body at positions where they respectively face the first and second cam portions, the first slip portion allowing the first cam portion to be elastically deformed inwardly when the second cylindrical portion turns in the direction of right and the first cam portion thereby makes contact with the ratchet portion located at the cancelling position, the second slip portion allowing the second cam portion to be elastically deformed inwardly when the second cylindrical portion turns leftward and the second cam portion thereby makes contact with the ratchet portion located at the cancelling position.

As for the cancelling device for the turn signal according to the present invention, when an operation lever is moved from a neutral position to a right or left turn position, a ratchet portion moves to a cancelling position. If a steering wheel is turned to the right or to the left in that state, a first cylindrical body becomes engaged with a second cylindrical body through a driving mechanism, and the second cylindrical body thereby turns to the right or to the left. When a first or second cam portion makes contact with the ratchet portion, the first or second cam portion elastically deforms and rolls off into a first or second slip portion and thereby passes the ratchet portion. The rotational angle through which the first or second cam portion travels when it is moved to that position past the ratchet portion is a cancel preparation angle. A left or right direction turn of the steering wheel from that position causes the second cylindrical body to turn in the direction of left or in the direction of right through the driving mechanism, and when the first or second cam portion is brought into abutment with the ratchet portion, the operation lever returns to the neutral position.

If the steering wheel is turned to the left or to the right after the ratchet portion has been moved to the cancelling position by bringing the operation lever from the neutral position to the right or left turn position, the first cylindrical portion becomes engaged with the second cylindrical portion through the driving mechanism, and the second cylindrical portion is turned to the left or to the right, bringing the second or first cam portion into abutment with the ratchet portion. However, the second or first cam portion which has abutted against the ratchet portion deforms and rolls off or moves into the second or first slip portion and thereby passes the ratchet portion. Contact of the first or second cam portion with the ratchet portion, which is attained by the further turning of the steering wheel to the left or to the right, causes the operation lever to return to the neutral position. The rotational angle through which the cam portion travels when it is moved to that position is a reverse cancelling angle.

DETAILED DESCRIPTION OF THE PREFERRED EMBODIMENT

An embodiment of the present invention will be described below with reference to the accompanying drawings.

Figure 1:
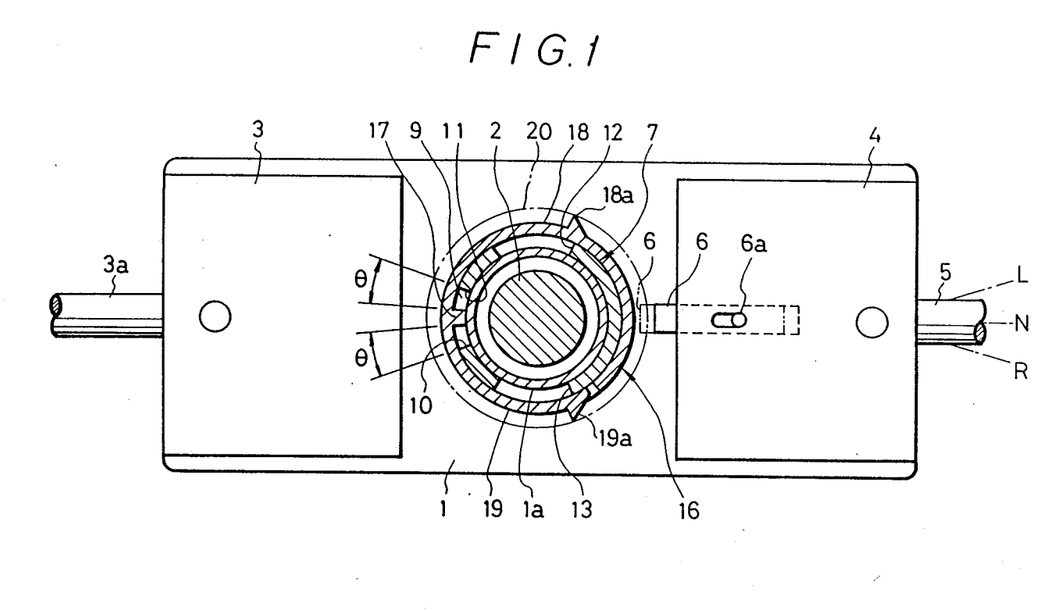
FIG. 1 is a plane view of a cancelling device, showing an embodiment of the present invention.
Figure 2:
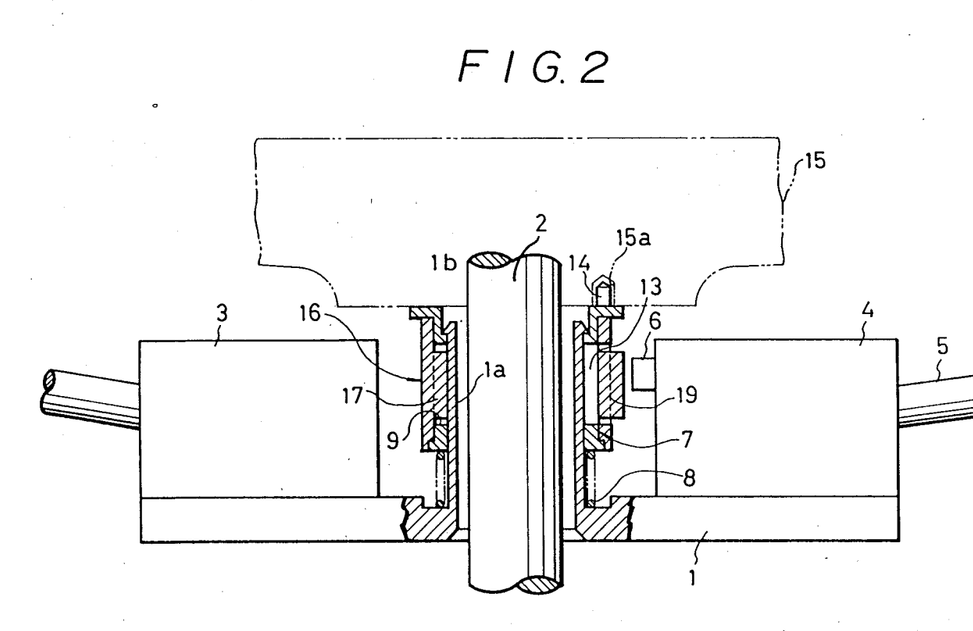
FIG. 2 is a side elevational view of the cancelling device of FIG. 1.
Figure 3:
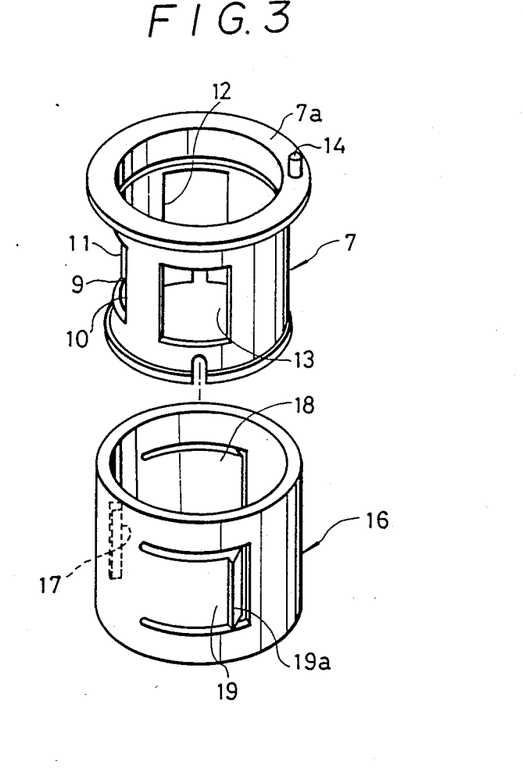
FIG. 3 is a perspective view of a cam guide member and a cam cylindrical body.

Referring first to FIGS. 1 and 2, switching body 1 has a cylindrical portion 1a at the center thereof, and a steering shaft 2 passes through the cylindrical portions 1a. The switching body 1 incorporates at the left side thereof as viewed in FIG. 1 a wiper switching unit 3 containing a wiper switch (not shown). The wiper switch is switched over between OFF, INT (intermittent), LO (low speed) and HI (high speed) by operating an operation lever 3a. The switching body 1 also incorporates a turn signal switching unit 4 serving as a mechanism portion at the right side thereof as viewed in FIG. 1. The turn signal switching unit 4 has an operation lever 5 at the right end portion thereof. The operation lever 5 is pivotal, and is operated from a neutral position (N) to a right turn position (R) or a left turn position (L). The turn signal switching unit 4 also has one ratchet portion 6 at the left end portion thereof which is closer to the cylindrical portion 1a. The ratchet portion 6 is pivotal around a shaft 6a, and is movable toward and away from the cylindrical portion 1a. The operation of the operation lever 5 from the neutral position (N) to the right (R) or left (L) turn position causes the ratchet portion 6 to move from a neutral position to a cancelling position indicated by a two-dot chain line. As shown in FIG. 3, a cam guide member 7 having a cylindrical form is mounted on the outer periphery of the cylindrical portion 1a of the switching body 1 in such a manner as to be pivotal and is slidable in the axial direction. The upper end portion of the cam guide member 7 with an engaging claw 1b of the cylindrical portion 1a. The cam guide member 7 is normally urged upwardly by a spring 8 interposed between the lower end portion and the switching body 1. The cam guide member 7 has on the outer periphery thereof a hole portion 9, a driving wall portion 10 serving as a driving portion for the turning to the right, and a driving wall portion 11 serving as a driving portion for the turning to the left, the driving portions 10 and 11 being formed on the two sides of the hole portion 9 so that they define the circumferential edges of the hole portion 9. The cam guide member 7 also has in the peripheral wall thereof first and second slip hole portions 12 and 13 which serves as first and second slip portions and which are in the form of a through-hole, the first and second slip hole portions 12 and 13 being formed at positions which are symmetrical with respect to the hole portion 9. A pin 14 protruding from an upper flange portion 7a of the cam guide member 7 is received by a hole portion 15a of the steering wheel 15, by means of which the cam guide member 7 is turned as the steering wheel 15 is turned. A cylindrical cam body 16 is pivotally fitted on the outer periphery of the cam guide member 7. The cylindrical cam body 16 has on the inner periphery thereof a protruding portion 17 which serves as a driven portion and which is inserted into the hole portion 9 of the cam guide member 7. As shown in FIG. 1, the protruding member 17 is respectively brought into abutment with the driving wall portions 10 and 11 of the cam guide member 7 after the cam guide member 7 has turned to the left or right through a rotational angle of θ which is a play. Thus, the protruding portion 17 and the driving wall portions 10 and 11 (the hole portion 9) form a driving mechanism for rotating the cylindrical cam body 16. The cylindrical cam body 16 has elastically deformable first and second cam portions 18 and 19 on the peripheral wall portion thereof, the first and second cam portions being formed at positions which are symmetrical with respect to the protruding portion 17 so that they respectively face the first and second slip hole portions 12 and 13 in the cam guide member 7. The cam portions 18 and 19 respectively have at the end portions thereof claw portions 18a and 19a having a triangular cross-section.

The operation of the thus-arranged cancelling device will now be described.

When the operation lever 5 is located at the neutral position (N), the ratchet portion 6 is also at the neutral position shown by the solid line in FIG. 1; that is, the forward end portion of the ratchet portion 6 is outside of the path 20 on which the claw portions 18a and 19b of the first and second cam portions 18 and 19 pivot. So, the rotation of the steering wheel 15 does not affect the ratchet portion 6.

The operation resulting from the operation of the operation lever 5 from the neutral position (N) to the right (R) or left (L) turn direction will be described below. Since the operation principles upon which the two types of operation are based are the same, only the operation resulting from the operation of the operation lever 5 to the right (R) turn direction will be described below.

Figure 4:
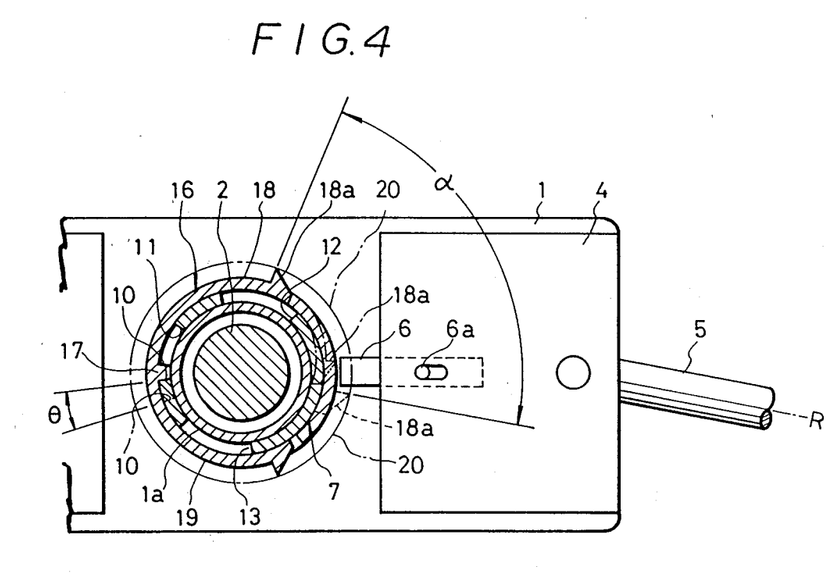
FIGS. 4 to 7 are views similar to FIG. 1, showing the different operational states.
Figure 5:
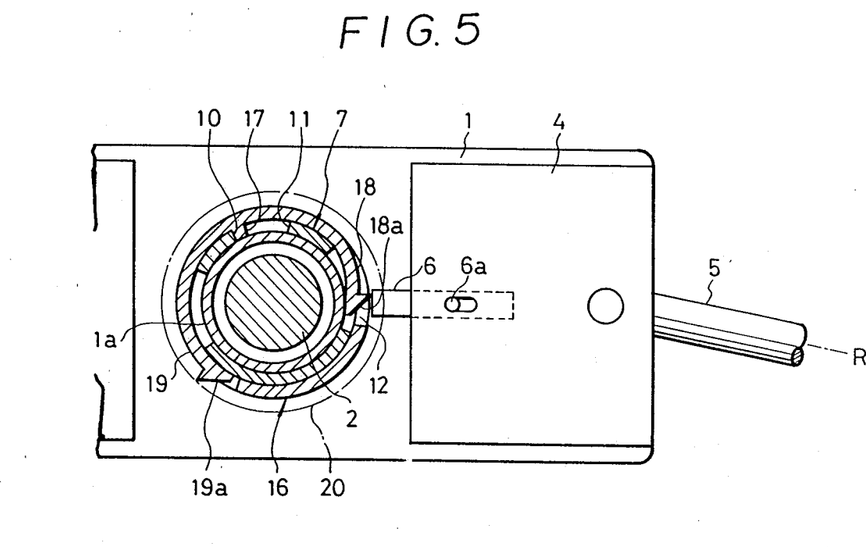

When the operation lever 5 is brought from the neutral position (N) to the right turn position (R), the ratchet portion 6 protrudes from the neutral position toward the cylindrical portion 1a and moves to a cancelling position, as shown in FIG. 4. This makes the forward end portion of the ratchet portion 6 to locate inside the path 20 on which the claw portions 18a and 19a of the first and second cam portions 18 and 19 pivot. If the steering wheel 15 is turned in the direction of right thereafter, the cam guide member 7 turns in the rightward direction from the state shown in FIG. 1 through the pin 14, and the driving wall portion 10 for the turn to the right abuts against the protruding portion 17 of the cylindrical portion 16 when the cam guide member 7 has turned through an angle $\theta$ which corresponds to a predetermined amount of play, as shown in FIG. 4, making the cylindrical cam body 16 rotatable to the right together with the cam guide member 7. At that time, the first cam portion 18 of the cylindrical cam body 16 faces the first slip hole portion 12 in the cam guide member 7, whereas the forward end portion of the second cam portion 19 of the cylindrical cam body 16 is in contact with the outer periphery of the cam guide member 7. If the cylindrical cam body 16 turns further, together with the cam guide member 7 by the further turning of the steering wheel 15 to the right, the claw portion 18a of the first cam portion 18 makes contact with the forward end portion of the ratchet portion 6, and the first cam portion 18 elastically deforms and rolls off into the first slip hole portion 12, as indicated by the two-dot chain line in FIG. 4 and shown in FIG. 5, so as to allow the claw portion 18a to pass the ratchet portion 6 (this being shown by the broken line in FIG. 4). The sum $(\theta+\alpha)$ of the rotational angle $\alpha$, through which the first cam portion 18 of the cylindrical cam body 16 travels when it is moved to that position past the ratchet portion 6 and the above-described rotational angle $\theta$ of the cam guide member 7, is a cancel preparation angle.

Figure 6:
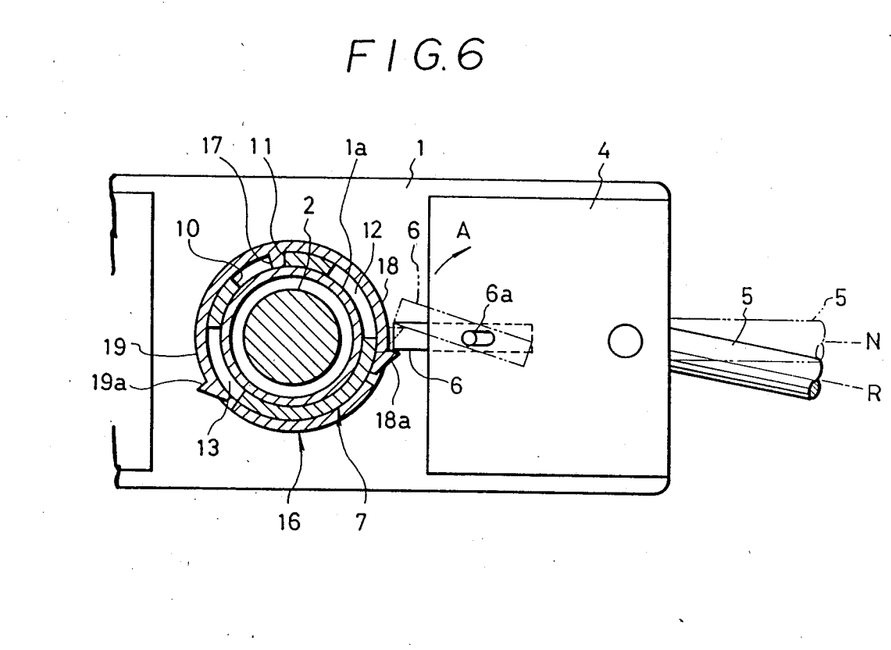

Next, if the steering wheel 15 is turned to the left from the state shown by the broken line in FIG. 4, the cam guide member 7 also turns in the same direction, and the driving wall portion 11 for the leftward turning abuts against the protruding portion 17 of the cylindrical cam body 16 after the cam guide member 7 has turned to the left through an angle $2\theta$, as shown in FIG. 6, making the cylindrical cam body 16 rotatable together with the cam guide member 7 in the direction of left. At that time, the second cam portion 19 faces the second slip portion 13, and the forward end portion of the first cam portion 18 is in contact with the outer periphery of the cam guide member 7. If the cylindrical cam body 16 turns further together with the cam guide member 7 to the left by the further turning of the steering wheel 15 to the left, the claw portion 18a of the first cam portion 18 abuts against the ratchet portion 6, pivoting it in the direction indicated by the arrow A and thereby returning the operation lever 5 to the neutral position (N).

Figure 7:
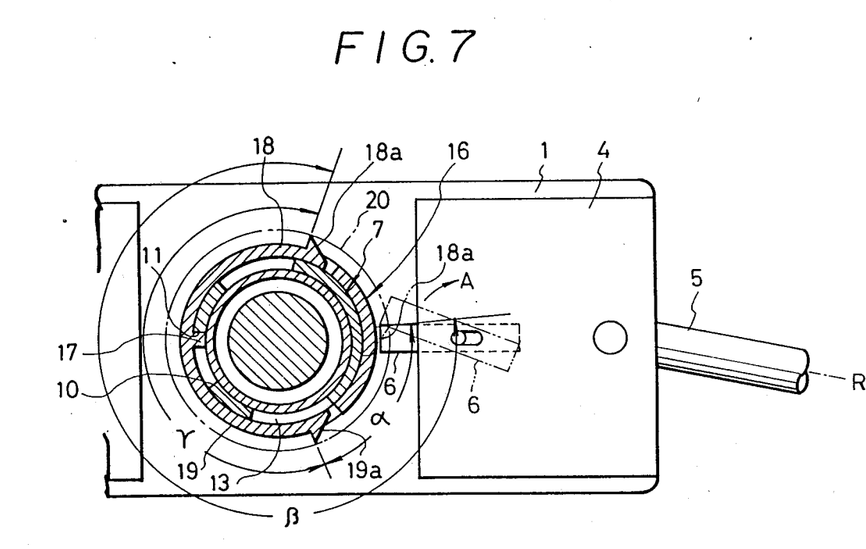

On the other hand, if the steering wheel 15 is turned to the left through angle $\theta$ in the state where the ratchet portion 6 has been moved to the cancelling position by operating the operation lever 5 to the right, the cam guide member 7 turns to the left and the driving wall portion 11 for the left turning abuts against the protruding portion 17 of the cylindrical cam body 16, as shown in FIG. 7, and subsequently, the cylindrical cam body 16 becomes rotatable integrally with the cam guide member 7 in the direction of left. At that time, the second cam portion 19 faces the second slip hole portion 13, and the forward end portion of the first cam portion 18 is in contact with the outer periphery of the cam guide member 7. If the cylindrical cam body 16 turns further, together with the cam guide member 7, as the result of the further turning to the left of the steering wheel 15, the claw portion 19a of the second cam portion 19 makes contact with the forward end portion of the ratchet portion 6, and the second cam portion 19 elastically deforms and rolls off into the second slip hole portion 13, like the first cam portion 18, so as to allow the claw portion 19a to pass the ratchet portion 6. The rotational angle through which the second cam portion 19 travels when it is moved to that position past the ratchet portion 6 is substantially the same as the cancel preparation angle. If the cylindrical cam body 16 is further turned to the left, the claw portion 18a of the first cam portion 18 abuts against the forward end portion of the ratchet portion 6, pivoting the ratchet portion 6 in the direction indicated by the arrow A and thereby returning the operation lever 5 to the neutral position (N). The sum $(\beta+\theta)$ of the rotational angle $\beta$ through which the first cam 18 of the cylindrical cam body 16 travels when it is moved to that position just past the ratchet portion 6 and the rotational angle $\theta$ of the cam guide member 7, is a reverse cancelling angle. Since this angle $(\beta+\theta)$ is substantially equal to the sum of an angle $\gamma$ formed between the claw portion 18a of the first cam portion 18 and the claw portion 19a of the second portion 19 and the cancel preparation angle $(\theta+\alpha)$, it can satisfy an objective value of the reverse cancelling angle which is 120 degrees or above.

In regards to the present embodiment, in the case where the cylindrical cam body 16 turns to the right in accordance with the rotational direction of the steering wheel 15, the first cam portion 18 elastically deforms and rolls off into the first slip hole portion 12 when it makes contact with the ratchet portion 6, whereas the second cam portion does not become elastically deformable when it makes contact with the ratchet portion 6. In the case where the cylindrical cam portion 16 turns to the left, the second cam portion 19 elastically deforms and rolls off into the second slip hole portion 13 when it makes contact with the ratchet portion 6, whereas the first cam portion 18 does not become elastically deformed when it makes contact with the ratchet portion 6. In consequence, the cancel preparation angle and the reverse cancelling angle can be set at different values. If the cancel preparation angle is set at about 80 degrees, for example, the reverse cancelling angle can be set at 120 degrees or above, which is sufficiently wider than the cancel preparation angle.

Furthermore, in the present embodiment, since only one ratchet portion 6 is provided on the side of the turn signal switching unit 4 which faces the cylindrical cam body 16, the turn signal switching unit 4 can be removed without removing the steering wheel 15, and the overhaul of the turn signal switching unit can be facilitated. This also applies to the removal of the wiper switching unit 4.

In regards to the above-described embodiment, in the case where the steering wheel 15 is turned in the same direction as that in which the operation lever 5 has been operated, when the cam portions 18 and 19 make contact with the ratchet portion 6, they escape into the slip hole portions 12 and 13, respectively. However, it may also be arranged such that the ratchet portion 6 pivots and rolls off. In this case, since the operation lever 5 is brought to the position that indicates the direction, which is the same as that in which the steering wheel 15 is turned, it does not return to the neutral position when the ratchet portion is pivoted.

In the above-mentioned embodiment, the hole portion 9 is formed to the cam guide member 7 and the driving wall portions 10 are formed to both the sides of the hole portion 9 to serve as the driving portions, and the protruding portion 17, which serve as a driven portion is formed to the cylindrical cam body 16. However, the cam guide member 7 may be provided with a protruding portion which is similar to the protruding portion 17, as well as driving portions for the turnings to the left, in which the driving portions being formed at both sides of the protruding portion, and the cylindrical cam body 16 may be provided with a hole portion which is similar to hole portion 9 and into which the protruding portion of the cam guide member 7 is inserted, the two ends of the hole portion serving as driven portions.

What is claimed is:

1. A cancelling device for a turn signal of a vehicle comprising:
   a mechanism portion having one ratchet portion which is movable to a cancelling position in accordance with the operation of an operation lever which is operated from a neutral position to right and left turn positions which are symmetrical with respect to said neutral position;
   a first cylindrical body through which a steering shaft is passed, said first cylindrical body including means for coupling said first cylindrical body with a steering wheel such that said first cylindrical body turns with said steering wheel in the same direction as that in which said steering wheel is turned;
   a second cylindrical body disposed on the outer periphery of said first cylindrical body wherein said second cylindrical body is rotatable relative to said first cylindrical body;
   a driving mechanism for drivingly engaging said first cylindrical body with said second cylindrical body after eliminating a predetermined amount of play so as to turn said cylindrical body in the same direction as that in which said first cylindrical body is turned when said first cylindrical body is turned to the left or to the right by turning said steering wheel in the left or right direction;
   elastically deformably first and second cam portions formed on said second cylindrical body at positions that are symmetrical in a circumferential direction of said second cylindrical body with respect to said driving mechanism; and
   first and second slip portions formed in said first cylindrical body at positions respectively adjacent said first and second cam portions, whereby the cancelling position of said ratchet is located within paths of movement of said first and second cam portions such that said first slip portion allows said first cam portion to be elastically deformed inwardly when said second cylindrical portion turns in the rightward direction and said first cam portion thereby abuts against said ratchet portion located at said cancelling position, and said second slip portion allows said second cam portion to be elastically deformed inwardly when said second cylindrical body turns in the leftward direction and said second cam portion thereby makes contact with said ratchet portion located at said cancelling position.

2. A cancelling device for a turn signal of a vehicle according to claim 1, wherein said driving mechanism includes a hole portion formed in one of said first and second cylindrical portions, and a protrusion formed in the other of said first and second cylindrical portions, said protrusion being inserted into said hole portion and being brought into abutment with the edge portion of said hole portion after said predetermined amount of play has been eliminated when said first and second cylindrical portions are rotated relative to each other.

3. A cancelling device for a turn signal of a vehicle according to claim 2, wherein said hole portion comprises a substantially rectangular hole portion, and said edge portion comprises opposing side edges of said hole portion.

4. A cancelling device for a turn signal of a vehicle according to claim 2, wherein each of said first and second slip portions comprises a hole formed in a peripheral wall of said first cylindrical body into which the respective first and second cam portions are accommodated.

5. A cancelling device for a turn signal of a vehicle according to claim 2, wherein each of said first and second cam portions includes a plate-like portion supported on a peripheral wall of said second cylindrical portion, said plate-like portion being opened at one circumferential end portion thereof.

6. A cancelling device for a turn signal of a vehicle according to claim 5, wherein said plate-like portion has at a forward end thereof a cam protrusion which protrudes outwardly in a radial direction of said second cylindrical portion.

7. A cancelling device for a turn signal of a vehicle according to claim 1, wherein an end surface of said first cylindrical portion faces said steering wheel and includes a protrusion which engages with said steering wheel.

8. A cancelling device for a turn signal of a vehicle comprising:
   a mechanism portion having one ratchet portion which is movable to a cancelling position by movement of an operation lever from a neutral position to right and left turn positions, said right and left turn being symmetrical with respect to said neutral position;
   a cam guide member having a substantially cylindrical form, a steering shaft passing through the center of said cam guide member, means for coupling said cam guide member with a steering wheel such that said cam guide member turns with said steering wheel;
a cylindrical cam body disposed adjacent to an outer periphery of said cam guide member wherein said cylindrical cam body is rotatable relative to said cam guide member;
a driving protrusion formed on one of said cam guide member and said cylindrical cam body, said driving protrusion protruding toward the other of said cam guide member and said cylindrical cam body;
a pair of contact portions formed on the other of said cam guide member and said cylindrical cam body, said contact portions receiving said driving protrusion therebetween, said contact portions making contact with said driving protrusion after eliminating a predetermined amount of play so as to allow said cylindrical cam body to be turned in a left or right direction when said cam guide member turns in a respective left or right direction relative to said cylindrical cam body;
elastically deformable first and second cam portions formed on said cylindrical cam body in a circumferential direction thereof at positions which are symmetrical with respect to said pair of contact portions; and
first and second slip portions formed in said cam guide member respectively adjacent said first and second cam portions, whereby the cancelling position of said ratchet is located within paths of movement of said first and second cam portions such that said first slip portion allows said first cam portion to be elastically deformed inwardly when said cylindrical cam body is turned to the right and said first cam portion thereby makes contact with said ratchet portion located at said cancelling position, and said second slip portion allows said second cam portion to be elastically deformed inwardly when said cylindrical cam body is turned to the left and said second cam portion thereby makes contact with said ratchet portion located at said cancelling position.

9. A cancelling device for a turn signal of a vehicle according to claim 8, wherein said pair of contact portions comprise a pair of opposing edge walls of a hole formed on the other of said cam guide member and said cylindrical cam body.

10. A cancelling device for a turn signal of a vehicle according to claim 9, wherein each of said first and second cam portions includes a plate-like portion which is supported on a peripheral wall of said cylindrical cam body, said plate-like portion being opened at one circumferential end portion thereof, said plate-like portion having a curvature substantially the same as that of said peripheral wall.

11. A cancelling device for a turn signal for a vehicle according to claim 10, wherein said plate-like portion has at a forward end thereof a cam protrusion which protrudes outwardly in a radial direction of said cylindrical cam body.

12. A cancelling device for a turn signal for a vehicle according to claim 11, wherein each of said first and second slip portions comprises a hole large enough to accommodate said cam protrusion therein.

13. A cancelling device for a turn signal for a vehicle comprising:
a mechanism portion disposed in the vicinity of a steering wheel and having one ratchet portion which is movable to a cancelling position by movement of an operation lever from a neutral position to right and left turn positions, said right and left turn positions being symmetrical with respect to said neutral position;
a cam guide member having a cylindrical form, a steering shaft being disposed in a central portion of said cam guide member, means for coupling said cam guide member with a steering wheel such that said cam guide member is turned together with said steering wheel;
a cylindrical cam body disposed adjacent to an outer periphery of said cam guide member and coaxially with respect to said cam guide member, said cylindrical cam body being rotatable relative to said cam guide member;
a driving protruding from an inner peripheral surface of said cylindrical cam body inwardly in a radial direction;
a pair of contact portions formed in said cam guide member for receiving said driving protrusion therebetween, said contact portions making contact with said driving protrusion after eliminating a predetermined amount of play so as to allow said cylindrical cam body to turn to the left or right when said cam guide member turns respectively to the left or right relative to said cylindrical cam body by turning of said steering wheel;
elastically deformable first and second cam portions formed in a circumferential direction of said cylindrical cam body at positions which are symmetrical with respect to said pair of contact portions; and
first and second slip portions formed in said cam guide member respectively adjacent said first and second cam portions, whereby the cancelling position of said ratchet is located within paths of movement of said first and second cam portions such that said first slip portion allows said first cam portion to be elastically deformed inwardly when said cylindrical cam body is turned to the right and said first cam portion thereby makes contact with said ratchet portion located at said cancelling position, and said second slip portion allows said second cam portion to be elastically deformed inwardly when said cylindrical cam body is turned to the left and said second cam portion thereby makes contact with said ratchet portion located at said cancelling position.

14. A cancelling device for a turn signal of a vehicle according to claim 13, wherein said pair of contact portions comprise a pair of said walls of a hole formed in said cam guide member in which said pair of side walls oppose each other in a circumferential direction of said cam guide member.

15. A cancelling device for a turn signal of a vehicle according to claim 14, wherein each of said first and second cam portions has a plate-like portion which is supported on a peripheral wall of said cylindrical cam body, said plate-like portion being opened at one circumferential end portion thereof, said plate-like portion having a curvature substantially the same as that of said peripheral wall.

16. A cancelling device for a turn signal for a vehicle according to claim 15, wherein said plate-like portion has at a forward end thereof a cam protrusion which protrudes outwardly in a radial direction of said cylindrical cam body.

17. A cancelling device for a turn signal for a vehicle according to claim 16, wherein each of said first and second slip portions comprises a hole large enough to accommodate said cam protrusion therein.

* * * * *